F. S. BECKETT.
CALCULATOR.
APPLICATION FILED SEPT. 6, 1910.

1,042,755.

Patented Oct. 29, 1912.

UNITED STATES PATENT OFFICE.

FRANKLIN S. BECKETT, OF BERKELEY, CALIFORNIA.

CALCULATOR.

1,042,755.  Specification of Letters Patent.  Patented Oct. 29, 1912.

Application filed September 6, 1910. Serial No. 580,774.

*To all whom it may concern:*

Be it known that I, FRANKLIN S. BECKETT, citizen of the United States, residing at Berkeley, in the county of Alameda and State of California, have invented new and useful Improvements in Calculators, of which the following is a specification.

My invention relates to a device for mechanically multiplying and dividing, and computing roots and powers of numbers.

The object of this invention is to provide a simple, practical device whereby the answer of mathematical problems may be determined mechanically with a minimum exercise of the mental faculties.

A further object is to provide a calculator in which a maximum length of scale is obtained in a minimum space so that the graduations or divisions are relatively large with relation to the size of the device itself whereby the accuracy of the computation is increased. This object is obtained primarily by the use of a spiral scale.

Another object is the provision of means for determining the decimal point as calculation proceeds, all as will be hereinafter more fully described.

The invention consists of the parts and the construction and combination of parts as hereinafter more fully described and claimed, having reference to the accompanying drawings, in which—

Figure 1:
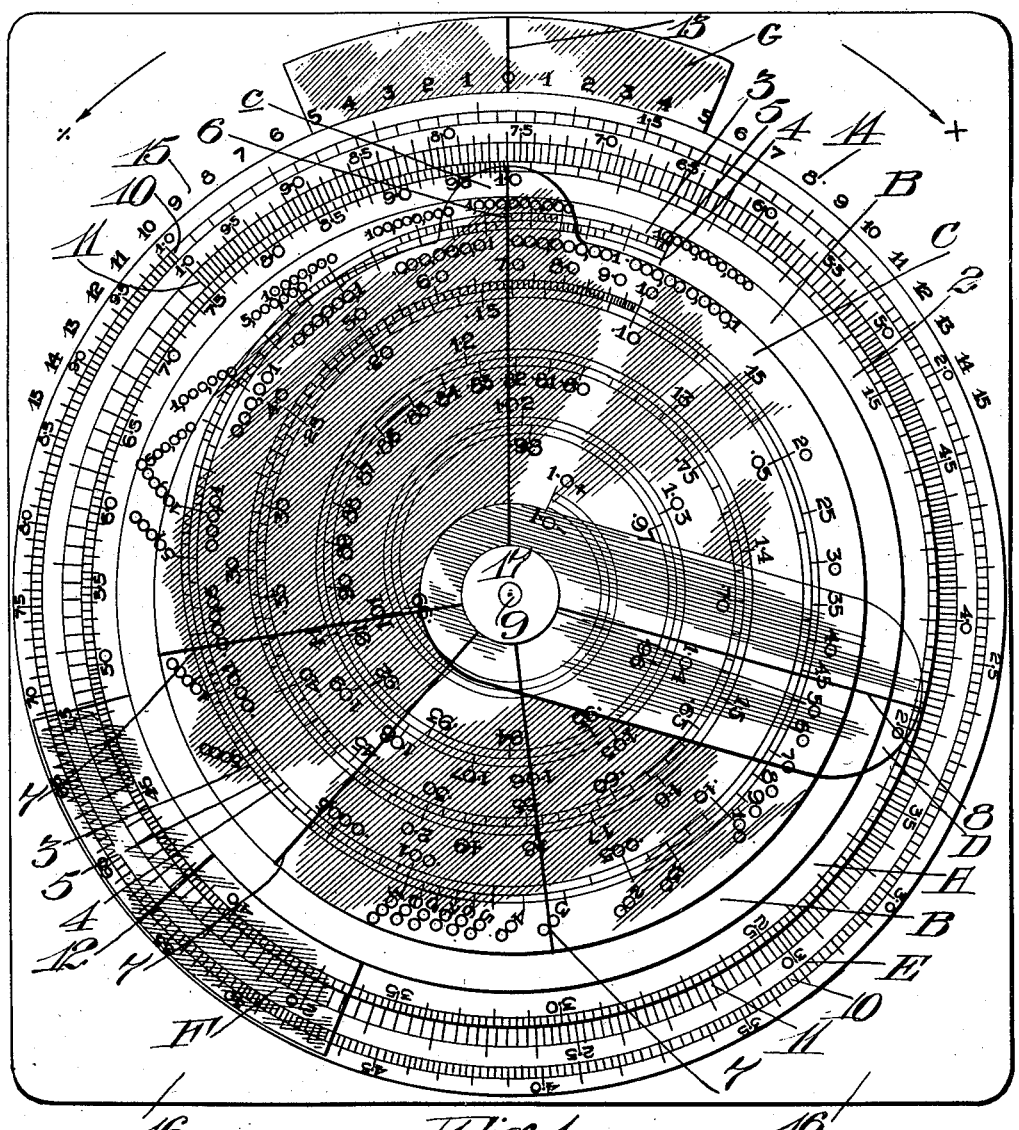
Figure 2:

Figure 1 is a plan view of the invention. Fig. 2 is a side elevation partly broken away.

In the practical embodiment of the invention represented in the drawings, A is a fixed disk having a continuous, logarithmic scale 2.

B is a radial disk spaced from, and arranged above, and of lesser diameter than, disk A and carrying two parallel, spirally arranged, log-log scales 3—4; which scales bear the same relation to the log scale 2 that the latter does to the natural scale. In other words, the scales 3—4 are the log of the logarithmic scale 2; the scale 4 being the reciprocal of scale 3. Scales 3—4 are spaced from one another by a spiral dividing line 5. The outside scale 3 is graduated from its inner end outward logarithmically from 1.0 to 10,000,000,000. The inner scale 4 is graduated from 1.0— from its inner end outwardly to .000,000,000,1. The outside scale 3 is used for roots and powers greater than 1, and the inside spiral 4 is used for roots and powers less than 1. For convenience I term scales 3—4 log-log scales.

Covering movable disk B is a transparent disk, such as a non-rotatable sheet of celluloid C through which the spiral log-log scales are visible and by which said scales and movable disk are protected. This transparent disk C has a radial projection c, and a fixed sight line 6 extends radially from the center of the transparent disk C through the projection c. This disk is also provided with other auxiliary sight lines 7, the function of which will be shown later.

D is a transparent, radial pointer, having a radial sight line 8, which is pivoted on the stud or post 9 which latter extends centrally through all the disks. This pointer D is turnable over the surface of the transparent disk C, and it is by means of this pointer with its radial sight line 8 in conjunction with the fixed sight line 6 and the scales 2—3—4 that all problems involving the computation of roots and powers are solved.

In practice, to find a power—First: Place the movable pointer D with its sight line 8 to the required power shown on the fixed, logarithmic scale 2. Second: Rotate spiral scale disk B until the fixed sight line 6 cuts the number whose power is to be determined. Third: Read the answer on the spiral scale cut by the movable sight line 8.

Thus, for example, if 4 is to be raised to the second power, move the pointer so that the radial sight line 8 points to 2 (the power) on the fixed, logarithmic scale 2. Then rotate the spiral scale until the fixed sight line 6 cuts the number 4. The answer 16 will show on the spiral scale underneath the radial sight line 8. To determine the roots of numbers, the operation is reversed; the fixed, logarithmic scale 2 representing the vincula of all numbers. The root shows on the spiral under fixed sight line 8. Thus, it will be seen that the fixed logarithmic scale represents the exponents and vincula of all numbers, and the spiral indicator the powers and roots and the numbers or products of the powers and roots.

The auxiliary, fixed sight lines 7 previously referred to are simply for easy discernment of the most ordinary powers and roots, like two, three, four and five.

For the purpose of multiplication and division there is used in conjunction with the fixed disk A with its logarithmic scale 2 a larger and lower rotatable disk E which has two concentric, logarithmic scales 10—11; the scale 10 progressing to the right and used for multiplication, and the inner scale progressing to the left and being used for division; both these scales 10—11 being visible beyond the perimeter of the fixed, logarithmic scale A.

F is a transparent segment pivoting on post 9 and movable over both the disks A—E and their respective scales, and carrying a radial sight line 12, the purpose of which segment F and sight line 12 will be apparent shortly.

G is a transparent decimal segment having a radial sight line 13 movable to right and left over the fixed scales 14—15 of the base 16. Scale 14 extends to the right from zero upward and is used when multiplying by 10 or a number greater than 10; and for dividing by a number less than one. Scale 15 extends from zero to the left progressively and is used when dividing by 10 or a number greater than 10; or multiplying by a number less than one. The beginning 1.0 of the two scales 10—11 represents a neutral point.

In operation to multiply 50 x 4:—First: The decimal point is moved one space to the right on the scale 14 by the decimal gage G, so that the line 13 extends over the numeral of the scale 14, and reduces 50 to 5.0. Second: Rotate gage F until sight line 12 cuts multiplicand 50 (5.0) on fixed log scale 2. Third: Rotate disk E carrying scales 10—11 until its neutral point 1.0 is cut by sight line 12 on gage F. Fourth: Then rotate gage F to the right until its sight line 12 cuts the multiplier 4 on multiplying scale 10; but each time gage F passes zero on scales 14—15 to the right the gage G, is moved an extra point to the right so that this now brings line 13 on G over "2" on scale 14. Fifth: Read the product which will be the number appearing on the fixed scale 2 underneath the sight line 12, which product will appear as 2.0, but the decimal indicator shows that the decimal point is to be moved two points to the right, so that the correct product is 200. With division, the operation is reversed; the segment F moving to the left and the decimal gage G moving an extra point to the left should segment F pass zero on scales 14—15.

In order that the several degrees B—C and that the degrees B—E, pointer D, and segment F—G may all be moved independent of one another and anyone of them moved without disturbing the others, I prefer to mount the several disk members on the post 9 in the following manner: This post is fixed in the base 16, Fig. 2, and carries a series of spaced, non-rotating washers 17. The rotatable parts G—E—B—D have large perforations fitting over the washers 17 and loosely revolving about these washers 17 as hubs, and between the washers are clamped the stationary disks A—C, and any necessary fixed fillers, as 18. The thickness of the rotatable parts G—E—B—D is less than the thickness of the washers so that the parts can be easily turned.

Having thus described my invention, what I claim and desire to secure by Letters Patent is—

1. A calculator having in combination a pair of superposed disks, the upper one of less diameter than the lower, and a central axis common to both, the lower disk being revoluble and having two concentric logarithms, one progressing in one direction and the other in the opposite direction, the upper disk being stationary and provided with an annular logarithmic scale, and a decimal indicator in conjunction with the lowermost of said disks.

2. A calculator having in combination a pair of superposed disks, the upper of less diameter than the lower, and a central axis common to both, the lower disk being revoluble and having two concentric, logarithmic scales, one progressing in one direction and the other in the opposite direction, the upper disk being stationary and provided with a logarithmic scale, a radial sight line movable over the scales on the disks, oppositely extending scales arranged in mathematical progression, and a decimal indicator in conjunction with the lowermost of said disks, said decimal indicator including a radial sight line movable right and left over said oppositely extending scales.

3. A calculator comprising in combination a suitable base and a vertical stud extending therefrom, a series of superposed, movable and fixed disk members concentric with the stud, washers fitting the stud and in the plane of the movable disks and about which the movable disks turn, said washers being slightly thicker than the movable disks and operative to hold the fixed disks clamp-fashion in stationary position.

In testimony whereof I have hereunto set my hand in the presence of two subscribing witnesses.

FRANKLIN S. BECKETT.

Witnesses:
 CHARLES EDELMAN,
 CHARLES A. PENFIELD.